(12) United States Patent
Luft et al.

(10) Patent No.: US 8,915,235 B2
(45) Date of Patent: Dec. 23, 2014

(54) MIXING SYSTEM FOR ENGINE WITH EXHAUST GAS RECIRCULATION

(75) Inventors: Aaron Luft, Frankfort, IN (US); Jeremy Byrd, West Lafayette, IN (US); Rohan Swar, Peoria, IL (US); Catalin Tiru, Lafayette, IN (US); Prasad Chodavarapu, West Lafayette, IN (US)

(73) Assignee: Caterpillar Inc., Peoria, IL (US)

( * ) Notice: Subject to any disclaimer, the term of this patent is extended or adjusted under 35 U.S.C. 154(b) by 116 days.

(21) Appl. No.: 13/170,987

(22) Filed: Jun. 28, 2011

(65) Prior Publication Data

US 2013/0000617 A1 Jan. 3, 2013

(51) Int. Cl.
*F02B 47/08* (2006.01)
*F02M 25/07* (2006.01)
*F02M 35/10* (2006.01)

(52) U.S. Cl.
CPC ..... *F02M 35/10222* (2013.01); *F02M 25/0707* (2013.01); *Y02T 10/121* (2013.01); *F02M 25/0722* (2013.01)
USPC .................. 123/568.11; 123/568.17; 123/590

(58) Field of Classification Search
USPC .................. 123/568.11, 568.17, 568.18, 590; 60/605.2
See application file for complete search history.

(56) References Cited

U.S. PATENT DOCUMENTS

| | | | | |
|---|---|---|---|---|
| 5,427,080 A | * | 6/1995 | Maeda et al. | 123/568.17 |
| 5,440,881 A | * | 8/1995 | Sudmanns et al. | 60/612 |
| 5,711,154 A | | 1/1998 | Baechle et al. | |
| 5,924,398 A | * | 7/1999 | Choi | 123/184.21 |
| 7,322,191 B2 | | 1/2008 | Tonetti et al. | |
| 7,624,722 B2 | | 12/2009 | Matthews | |
| 8,096,289 B2 | * | 1/2012 | Braun et al. | 123/568.11 |
| 2002/0088443 A1 | * | 7/2002 | Marthaler et al. | 123/568.17 |
| 2006/0283429 A1 | * | 12/2006 | Kuhnel et al. | 123/568.18 |
| 2009/0067988 A1 | * | 3/2009 | Eluripati et al. | 415/116 |
| 2009/0101123 A1 | * | 4/2009 | Brogdon et al. | 123/568.15 |
| 2009/0165756 A1 | * | 7/2009 | Shieh et al. | 123/568.17 |
| 2010/0122693 A1 | | 5/2010 | Braun et al. | |
| 2010/0300072 A1 | * | 12/2010 | Alizon et al. | 60/280 |
| 2011/0192383 A1 | * | 8/2011 | Morais | 123/568.17 |

FOREIGN PATENT DOCUMENTS

DE 102004025254 12/2005
WO 0183975 11/2001

* cited by examiner

*Primary Examiner* — Erick Solis
*Assistant Examiner* — Anthony L Bacon
(74) *Attorney, Agent, or Firm* — Leydig, Voit & Mayer, Ltd.

(57) ABSTRACT

An air exhaust mixer assembly includes an upstream intake section with an upstream elbow and a downstream elbow. A mixing tube is configured to introduce exhaust gas into the upstream intake section at a location upstream of the downstream elbow. An internal combustion engine utilizing the air exhaust mixer assembly is also provided.

20 Claims, 7 Drawing Sheets

MIXING SYSTEM FOR ENGINE WITH EXHAUST GAS RECIRCULATION

TECHNICAL FIELD

This disclosure relates generally to an internal combustion engine with an exhaust gas recirculation system and, more particularly, to an air exhaust mixer assembly for mixing intake air with exhaust gas.

BACKGROUND

An exhaust gas recirculation system may be used to reduce the generation of undesirable pollutant gases during the operation of internal combustion engines. Exhaust gas recirculation systems generally recirculate exhaust gas generated during the combustion process into the intake air supply of the internal combustion engine. The exhaust gas introduced into the engine cylinders displaces a volume of the intake air supply that would otherwise be available for oxygen. Reduced oxygen concentrations lower the maximum combustion temperatures within the cylinders and slow the chemical reactions of the combustion process, which decreases the formation of oxides of nitrogen ($NO_x$).

The intake air supply is often compressed through a turbocharger and then supplied to an intake manifold. Exhaust gas is introduced into the intake air supply between the turbocharger and the intake manifold. Structures for mixing the exhaust gas with the intake air supply may take many different forms. The flow characteristics of the intake air supply and the exhaust gas affect the degree to which the air and the exhaust gas mix. Consistent mixing of the air and exhaust gas typically results in improved engine performance.

U.S. Pat. No. 7,624,722 discloses a system for recirculating exhaust gas within an internal combustion engine. An intake air conduit receives an intake air stream and an exhaust gas stream and blends or mixes the two streams together. A volute redirects the exhaust gas stream into the intake air stream to achieve the desired mixing.

The foregoing background discussion is intended solely to aid the reader. It is not intended to limit the innovations described herein nor to limit or expand the prior art discussed. Thus the foregoing discussion should not be taken to indicate that any particular element of a prior system is unsuitable for use with the innovations described herein, nor is it intended to indicate any element, including solving the motivating problem, to be essential in implementing the innovations described herein. The implementations and application of the innovations described herein are defined by the appended claims.

SUMMARY

An internal combustion engine having an exhaust gas recirculation system is provided. In one aspect, an internal combustion engine has a plurality of combustion cylinders and an exhaust gas system fluidly connected to the plurality of combustion cylinders. A turbocharger may be fluidly connected to the exhaust gas system. An intake air system supplies air to the combustion cylinders. The intake air system includes an upstream intake section having an upstream elbow and a downstream elbow. A downstream intake manifold receives air from the upstream intake section and supplies the air to the combustion cylinders. An exhaust gas recirculation system recirculates exhaust gas from the exhaust gas system to the intake air system. The exhaust gas recirculation system includes a mixing tube configured to introduce exhaust gas into the upstream intake section at a location upstream of the downstream elbow.

In another aspect, an air exhaust mixer assembly includes an upstream intake section including an upstream elbow and a downstream elbow. The upstream elbow has a first leg and a second leg connected by an upstream bend. The downstream elbow has a third leg and a fourth leg connected by a downstream bend. The downstream elbow is located downstream from the upstream elbow. The second leg of the upstream elbow and the third leg of the downstream elbow are generally linearly aligned. A mixing tube is configured to introduce exhaust gas into the upstream intake section at a location upstream of the downstream elbow.

In another aspect, a method of mixing air and exhaust gas for an internal combustion engine includes flowing exhaust gas into an exhaust gas system. A portion of the exhaust gas is diverted into an exhaust gas recirculation system. Intake air is directed into an intake air conduit. The intake air is redirected along a first curved path generally along a first plan. The intake air is redirected along a second curved path generally along a second plane. The second plane is non-parallel to the first plane. The intake air is infused with the redirected portion of the exhaust gas at a location upstream of the second curved path.

DETAILED DESCRIPTION

Figure 1:
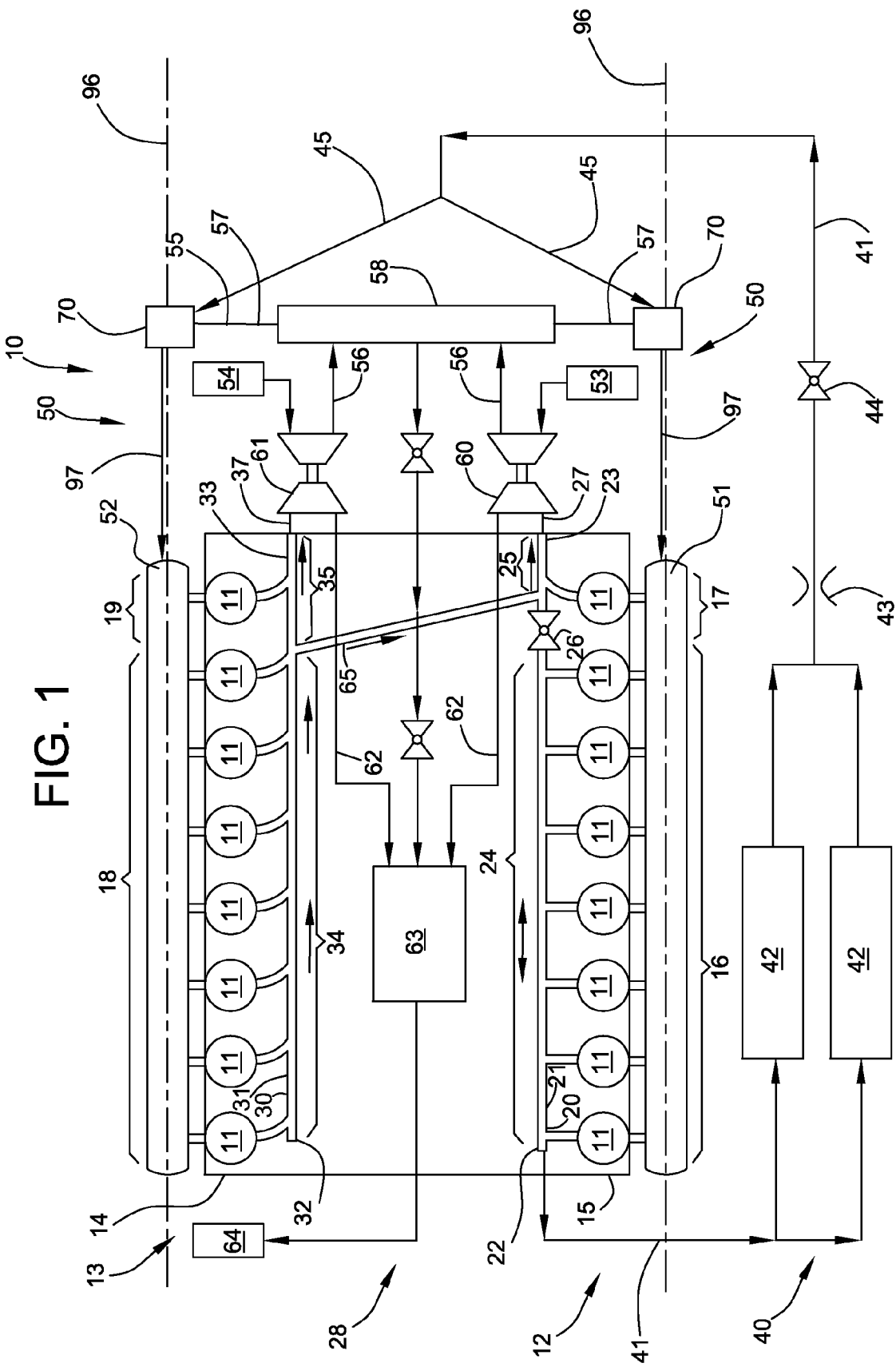
FIG. 1 is a schematic illustration of an internal combustion engine in accordance with the disclosure.
Figure 2:
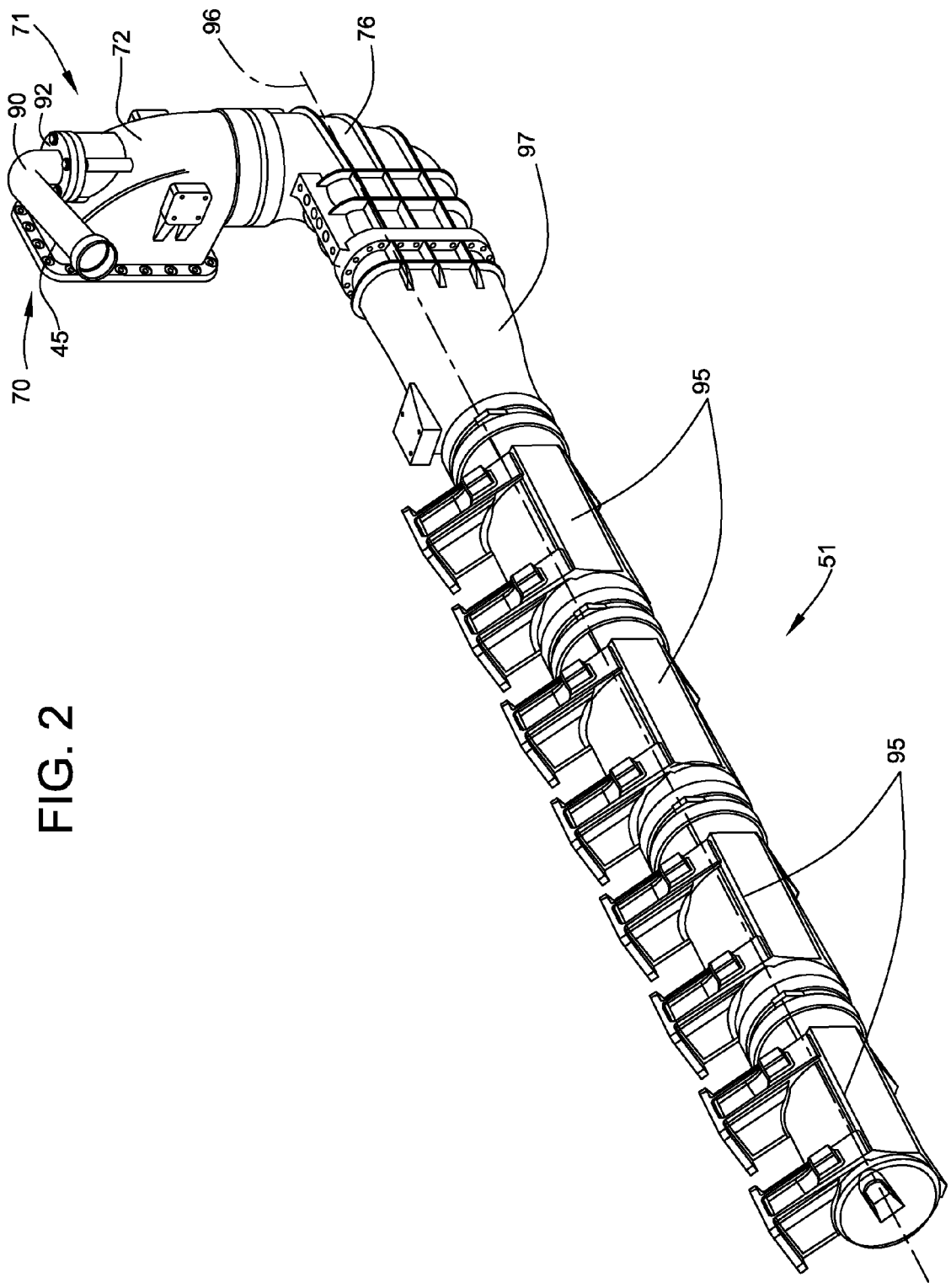
FIG. 2 is a perspective view of an air exhaust mixer assembly and a downstream intake manifold in accordance with the disclosure.
Figure 3:
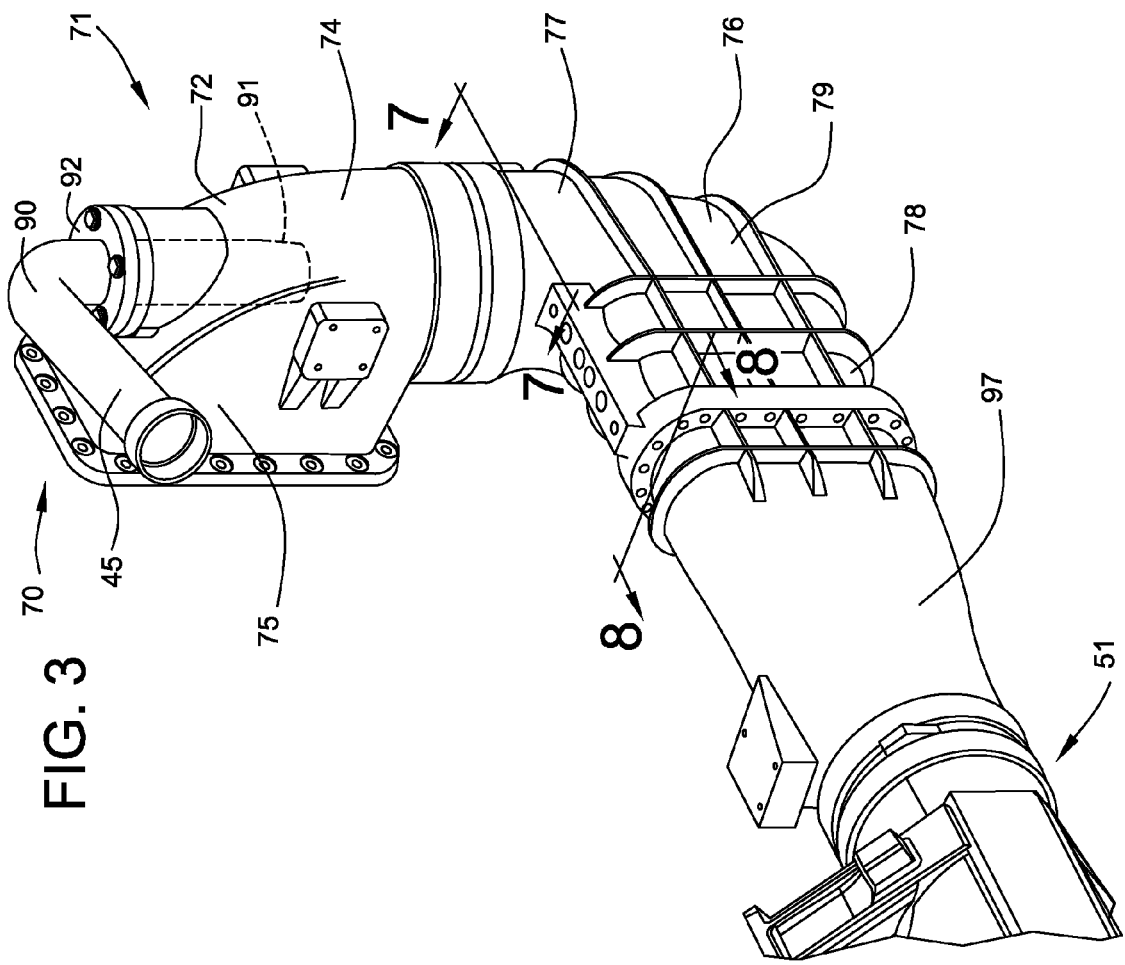
FIG. 3 is an enlarged perspective view of the air exhaust mixer assembly of FIG. 2.
Figure 4:
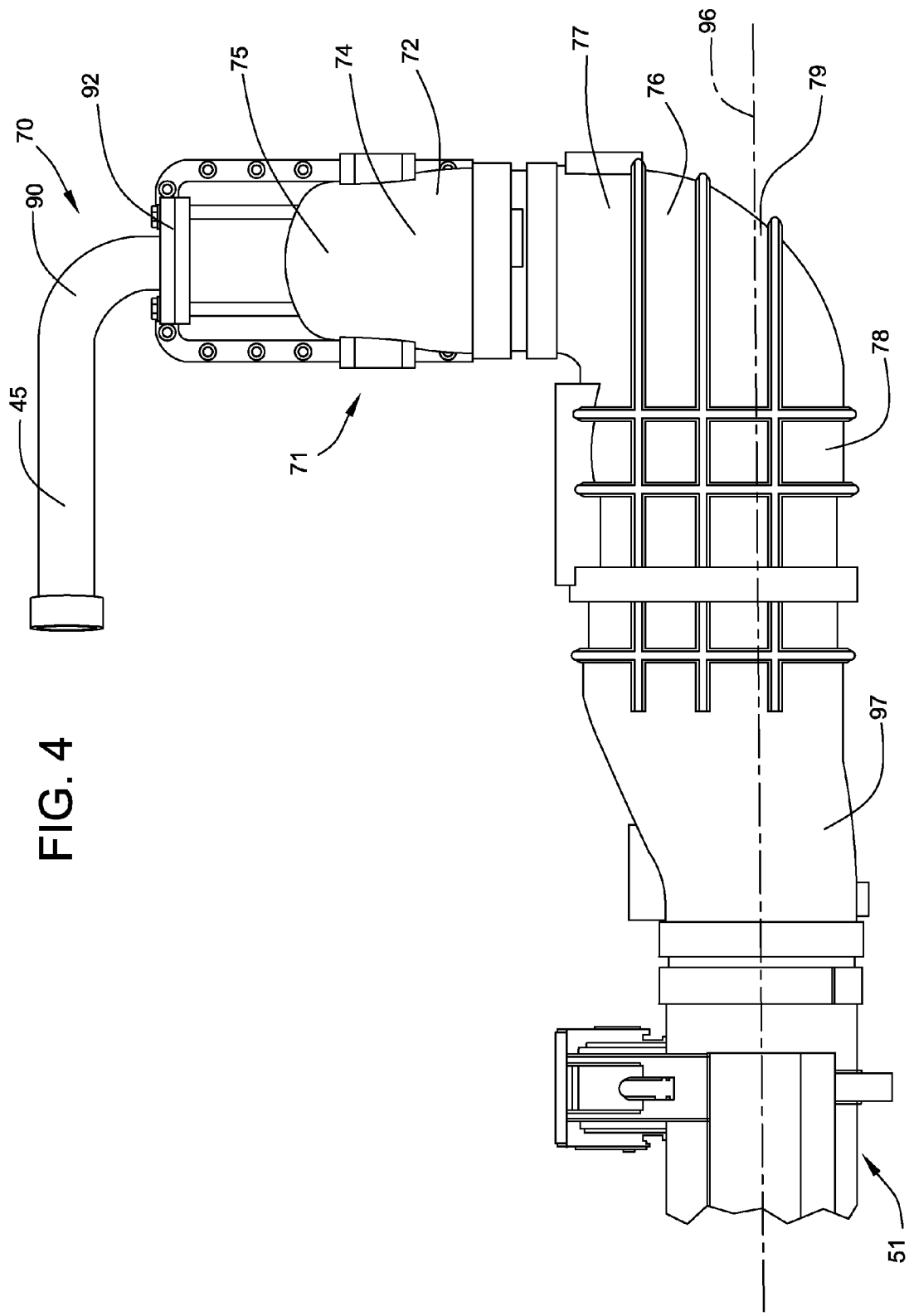
FIG. 4 is a side view of the air exhaust mixer assembly of FIG. 3.
Figure 5:
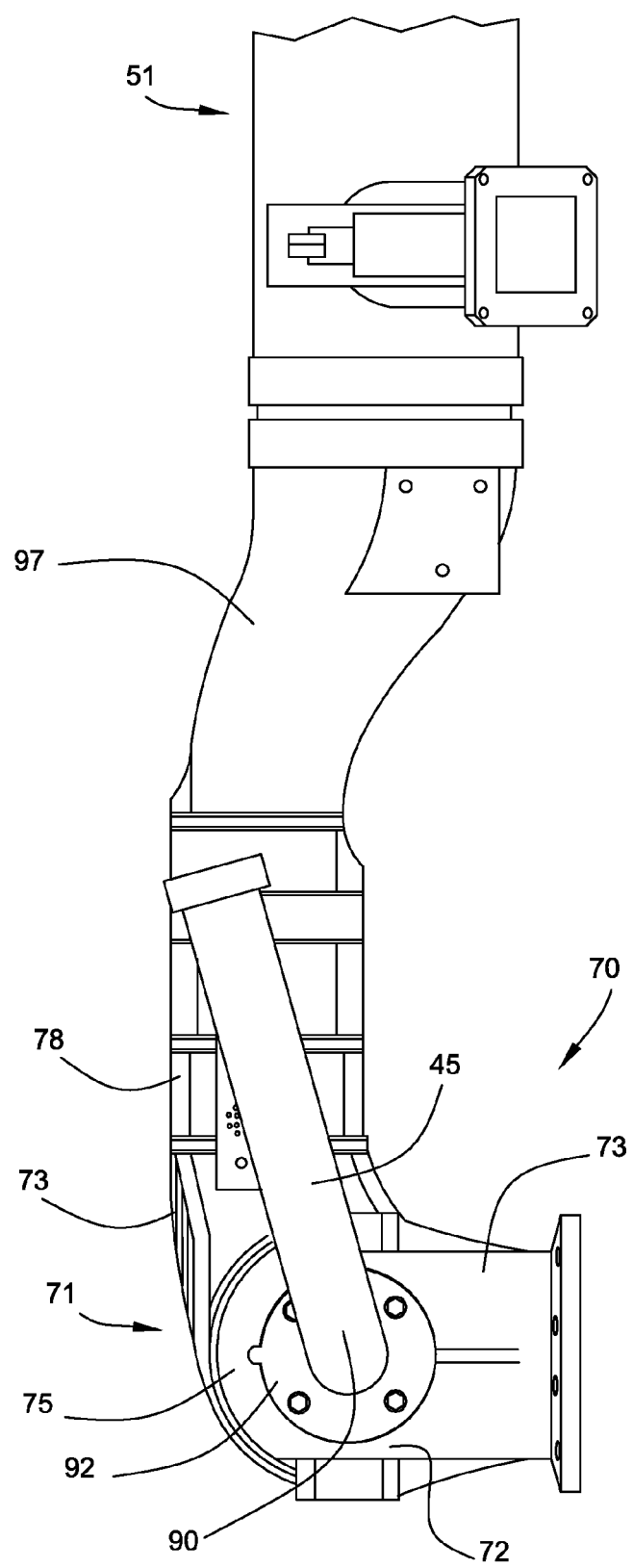
FIG. 5 is a top plan view of the air exhaust mixer assembly of FIG. 3.
Figure 6:
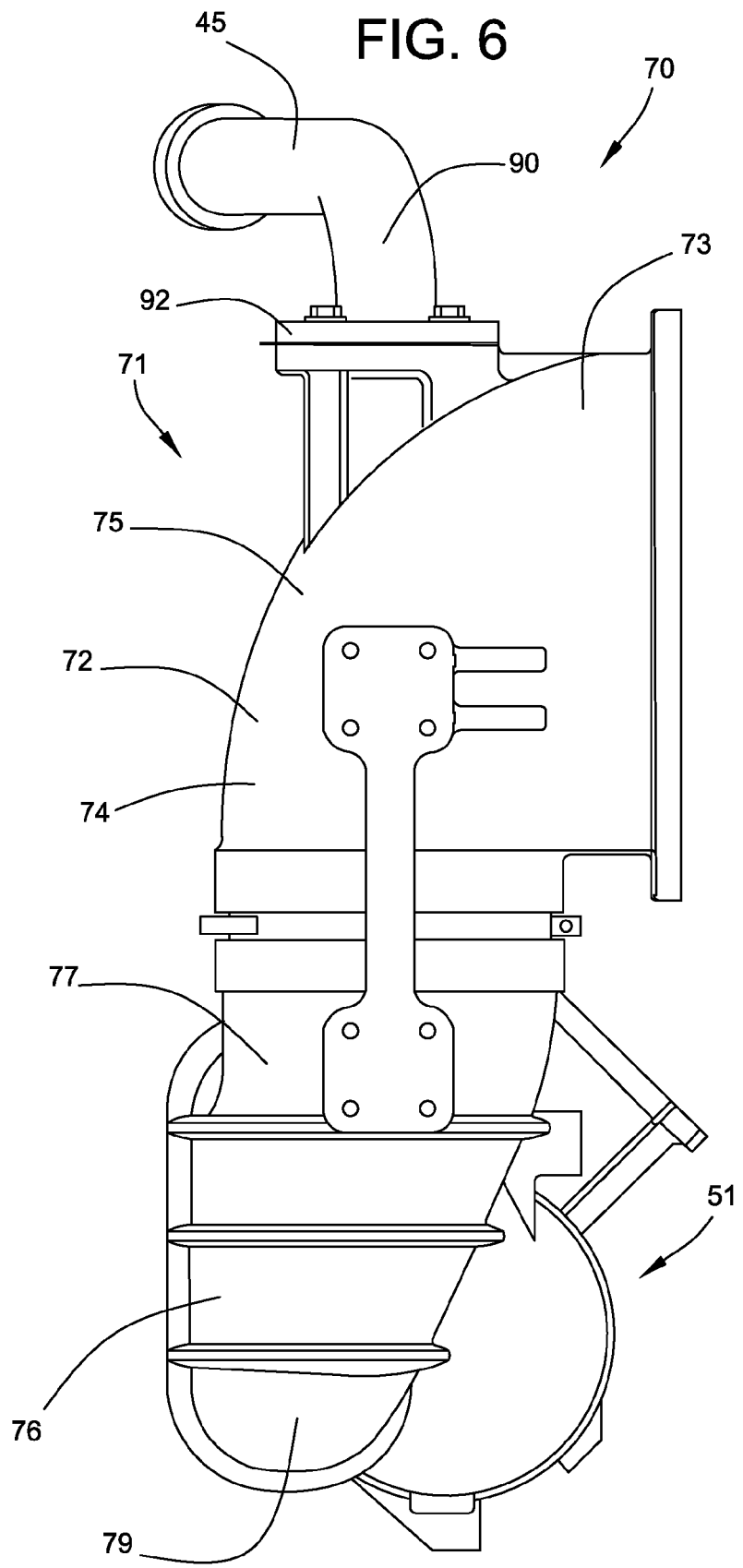
FIG. 6 is an end view of the air exhaust mixer assembly of FIG. 3.

FIG. 1 depicts an internal combustion engine 10 having a plurality of combustion cylinders 11 configured as a first cylinder bank 12 and a second cylinder bank 13 generally parallel to the first cylinder bank. An exhaust gas system 28 includes a first exhaust gas line 20 and a second exhaust gas line 30. The first exhaust gas line 20 is fluidly connected to the first cylinder bank 12 and the second exhaust gas line 30 is fluidly connected to the second cylinder bank 13. Compressed air is supplied to the first and second cylinder banks 12, 13 by intake air system 50. An exhaust gas recirculation system 40 provides for the recirculation of exhaust gas into the intake air system 50 in order to reduce the emissions of the internal combustion engine 10.

A first cylinder head 14 is secured to the internal combustion engine 10 adjacent the first cylinder bank 12 and a second cylinder head 15 is secured to the internal combustion engine adjacent the second cylinder bank 13 of combustion cylinders. The first cylinder bank 12 includes a first cylinder group 16 and a second cylinder group 17. The second cylinder bank 13 includes a first cylinder group 18 and a second cylinder group 19. While the first cylinder group 16 of first cylinder bank 12 and the first cylinder group 18 of the second cylinder bank 13 are each depicted with seven combustion cylinders 11 and the second cylinder group 17 of the first cylinder bank 12 and the second cylinder group 19 of the second cylinder bank 13 are each depicted with one combustion cylinder 11, the combustion cylinders of each cylinder bank may be grouped as desired to define or form cylinder groups having different numbers of combustion cylinders.

First exhaust gas line 20 includes a first exhaust manifold 21 that is fluidly connected to the first cylinder bank 12. First exhaust manifold 21 has a first end 22 and an opposite exhaust end 23 with a first section 24 and a second section 25 between the two ends. An exhaust restriction valve 26 may be positioned between the first section 24 and the second section 25. A first extension pipe 27 extends between the exhaust end 23 of first exhaust manifold 21 and first turbocharger 60 and fluidly connects the first exhaust manifold to the first turbocharger.

Second exhaust gas line 30 includes a second exhaust manifold 31 that is fluidly connected to the second cylinder bank 13. The second exhaust manifold 31 may be generally parallel to the first exhaust manifold and has a first end 32 and an opposite exhaust end 33 with a first section 34 and a second section 35 between the two ends. A second extension pipe 37 extends between the exhaust end 33 of the second exhaust manifold 31 and second turbocharger 61 and fluidly connects the second exhaust manifold to the second turbocharger.

Exhaust gas from the first cylinder group 16 of the first cylinder bank 12 is received within the first section 24 of the first exhaust manifold 21 and, depending upon the positions of exhaust restriction valve 26 and exhaust gas recirculation valve 44, may be routed through the exhaust gas recirculation system 40. The exhaust gas recirculation system 40 includes an exhaust gas recirculation duct 41 that may be fluidly connected to the first end 22 of the first exhaust gas line 20 so that exhaust gas from the first cylinder group 16 of the first cylinder bank 12 may be routed or recirculated through the exhaust gas recirculation system and introduced into the intake air system 50.

Exhaust gas passing through exhaust gas recirculation duct 41 is cooled by one or more cooling components 42. The flow rate through exhaust gas recirculation duct 41 may be monitored by a flow meter 43 such as a venturi-style flow meter. An exhaust gas recirculation control valve 44 may be provided along exhaust gas recirculation duct 41 to control exhaust gas flow through the exhaust gas recirculation system 40. Exhaust gas recirculation control valve 44, together with exhaust restriction valve 26, controls the amount of exhaust gas that is mixed with air that has been compressed by the first turbocharger 60 and the second turbocharger 61 prior to the air entering the first downstream intake manifold 51 and the second downstream intake manifold 52. The exhaust gas recirculation duct 41 of the exhaust gas recirculation system 40 may split into two separate legs 45. Each leg 45 fluidly connects to the intake air system 50 between the aftercooler 58 and the first downstream intake manifold 51 and the second downstream intake manifold 52, respectively.

Intake air system 50 includes a first air intake 53 through which atmospheric air enters the first turbocharger 60, a second air intake 54 through which atmospheric air enters the second turbocharger 61 and a compressed air line 55 through which compressed air is supplied to combustion cylinders 11. More specifically, atmospheric air is compressed by the first and second turbochargers 60, 61 and passes through first compressed air lines 56 to aftercooler 58. Cooled compressed air exits the aftercooler 58 and enters second compressed air lines 57 that are each fluidly connected to an air exhaust mixer assembly indicated schematically at 70 in FIG. 1. Each air exhaust mixer assembly 70 is fluidly connected to a respective one of the first and second downstream intake manifolds 51, 52. Each leg 45 of the exhaust gas recirculation system 40 intersects with and fluidly connects to a respective one of the air exhaust mixer assemblies 70. Each air exhaust mixer assembly 70 mixes compressed air from the aftercooler 58 with exhaust gas from the exhaust gas recirculation system 40 and the air exhaust gas mixture is subsequently supplied to a respective one of the first downstream intake manifold 51 and the second downstream intake manifold 52. It should be noted that although the internal combustion engine 10 depicted in FIG. 1 includes two cylinder banks, the air exhaust mixer assembly 70 disclosed herein may also be used with internal combustion engines having only a single, in-line bank of combustion cylinders.

Referring to FIGS. 2-6, each air exhaust mixer assembly 70 includes an upstream intake section 71 that forms a part of the air supply system 50. Upstream intake section 71 has an upstream elbow 72 and a downstream elbow 76 positioned downstream of the upstream elbow. Upstream elbow 72 has an upstream or first leg 73, and a downstream or second leg 74 connected by an upstream bend 75. Downstream elbow 76 has an upstream or third leg 77 and a downstream or fourth leg 78 connected by a downstream bend 79. Each of the first leg 73, second leg 74, third leg 77, and fourth leg 78 are generally linear. Each of the upstream bend 75 and the downstream bend 79 are bent at approximately ninety degree angles. The upstream elbow 72 and downstream elbow 76 may have bends of other angles.

The upstream or first leg 73 of upstream elbow 72 is fluidly connected to aftercooler 58. If desired, the path or intake air conduit between the first leg 73 and the aftercooler 58 may be linear to minimize the pressure drop along the conduit between the first leg and the aftercooler. The downstream or second leg 74 of the upstream elbow 72 is fluidly connected and generally aligned with the upstream or third leg 77 of the downstream elbow 76. The upstream or first leg 73 and the downstream or second leg 74 of upstream elbow 72 are generally perpendicular to the downstream or fourth leg 78 of downstream elbow 76.

An exhaust gas recirculation elbow 90 may be located at the end of leg 45 of exhaust gas recirculation system 40 and has a generally linear mixing tube 91 fluidly connected and extending downwardly therefrom. Exhaust gas recirculation elbow 90 includes a flange 92 for securing the elbow to a port 80 of the upstream intake section 71. As depicted, port 80 is positioned so that mixing tube 91 is upstream of downstream elbow 76 and extends into upstream elbow 72 at the upstream bend 75. This configuration introduces exhaust gas into the upstream intake section 71 at the upstream elbow. Mixing tube 91 may be generally parallel to the downstream or second leg 74 of upstream elbow 72 (and generally perpendicular to the upstream or first 73 of the upstream elbow) which results in a relatively efficient use of space and a relatively compact structure. Although depicted as introducing exhaust gas into the upstream elbow 72, the mixing tube may be placed further upstream.

Figure 8:
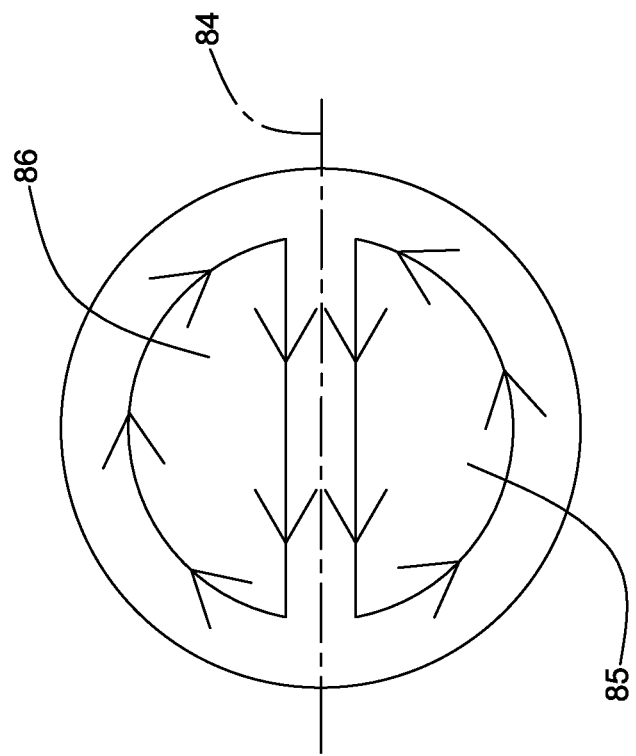
FIG. 8 is a diagrammatic cross-section taken generally along line 8-8 of FIG. 3.

Air passing through an elbow generally produces two rotating regions of air flow that rotate in generally opposite directions. As depicted generally in FIG. 7, air passing through the upstream elbow 72 has a first region of rotation 82 (depicted as rotating in a counterclockwise direction) and a second region of rotation 83 (also depicted as rotating in a clockwise direction). As a result, the air flow of the first region of rotation 82 and the air flow of the second region of rotation 83 along the vertical centerline 84 move in the same direction. As the air passes through the downstream elbow 76, the flow of air transitions to a third region of rotation 85 (FIG. 8) (depicted as rotating in a counterclockwise direction) and a fourth region of rotation 86 (depicted as rotating in a clockwise direction). However, since the upstream elbow 72 and the downstream elbow 76 are rotated or oriented at ninety degrees relative to one another, the air flow through the upstream elbow and the downstream elbow is also rotated ninety degrees relative to each other. The airflow along centerline 84 remains in the same direction. It should be noted that although the air flow is depicted as rotating counterclockwise in regions 82, 85 and counterclockwise in regions 83, 86, in practice, the air flow may be in opposite directions and may only generally resemble the patterns depicted in FIGS. 7-8. In addition, although FIGS. 7-8 depict the cross-section as being circular, in practice, the cross-sections may be oval or many other shapes.

Figure 7:
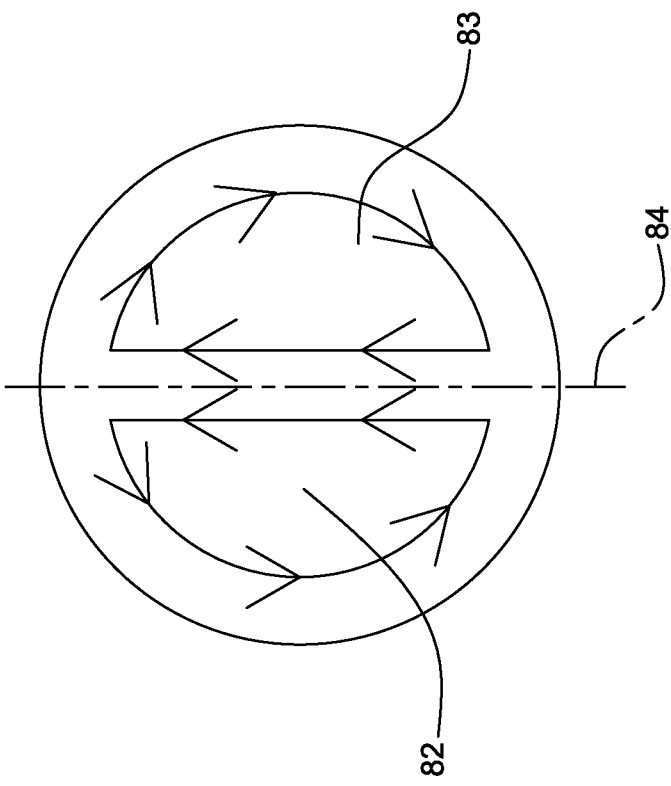
FIG. 7 is a diagrammatic cross-section taken generally along line 7-7 of FIG. 3.

The introduction of the exhaust gas from mixing tube 91 into upstream elbow 72 during the transition of the air flow within the upstream elbow from a somewhat linear pattern to the two oppositely rotating regions of FIG. 7 results in a significant amount of mixing of the air and exhaust gas. As the air and exhaust gas pass through the downstream elbow 76, the air flow transitions from that depicted in FIG. 7 to the flow pattern depicted in FIG. 8. The transition from the flow pattern of FIG. 7 to the flow pattern of FIG. 8 results in an even greater mixing of the air and exhaust gas. Through such a configuration of the air exhaust mixer assembly 70, a relatively simple mixing tube 91 may be used without significantly reducing the degree to which the air and exhaust gas are mixed. In other words, the air exhaust mixer assembly 70 permits the use of a less complex, and thus less expensive, mixing tube while still achieving a desirable level of mixing of air and exhaust gas.

Although the upstream elbow 72 and the downstream elbow 76 are depicted with approximately ninety degree bends, it is believed that satisfactory mixing may still occur if the bends are at angles other than approximately ninety degrees. That is, either or both of the upstream elbow 72 and the downstream elbow 76 may be replaced by a pair of elbows (not shown) that each have a forty-five degree bend or three elbows (not shown) that each have a sixty degree bend. In some configurations, ducts and the intake manifolds may be utilized such that the total angle of all of the elbows does not equal one hundred and eighty degrees. In addition, although the upstream elbow 72 is rotated approximately ninety degrees relative to the downstream elbow 76, it is believed that satisfactory mixing may still occur at angles other than approximately ninety degrees. For example, it is believed that satisfactory mixing may still occur with a range of angles of between sixty and one hundred and twenty degrees. In some applications, satisfactory mixing may occur with a range of angles between forty-five and one hundred and thirty-five degrees. If greater mixing is desired based upon a given set of angles of the elbows and the angular orientation of the elbows, a mixing tube 91 of greater complexity may be used.

The first downstream intake manifold 51 and the second downstream intake manifold 52 may each be a generally elongated member formed of a plurality of intake manifold elements 95 arranged in a linear array along a longitudinal axis 96. The downstream or fourth leg 78 of the downstream elbow 76 of each upstream intake section 71 may be generally parallel to the longitudinal axis 96 of a respective one of the first downstream intake manifold 51 and the second downstream intake manifold 52 and is fluidly connected to its respective downstream intake manifold by a generally linear path or conduit section 97.

A portion of exhaust gas from the first cylinder group 16 of the first cylinder bank 12 may, at times be, routed through the exhaust gas recirculation system 40 rather than through the first exhaust gas line 20. For this reason, a duct or exhaust gas balance tube 65 is fluidly connected between the first exhaust gas line 20 and the second exhaust gas line 30 to balance or equalize, to a controllable extent, the amount of exhaust gas passing through the first and second turbochargers 60, 61. In other words, the exhaust gas balance tube 65 provides a path for exhaust gas to travel from second exhaust gas line 30 towards first exhaust gas line 20 to balance the flow through the first and second turbochargers 60, 61.

After the exhaust gas from the first cylinder bank 12 and second cylinder bank 13 passes through the first and second turbochargers 60, 61, respectively, it exits the turbochargers through turbocharger exhaust gas lines 62. Turbocharger exhaust gas lines 62 are fluidly connected to an exhaust aftertreatment system 63 such as a diesel particulate filter so that the exhaust gas may be filtered prior to being discharged or released to the atmosphere through exhaust gas outlet 64.

INDUSTRIAL APPLICABILITY

The industrial applicability of the system described herein will be readily appreciated from the foregoing discussion. The present disclosure is applicable to internal combustion engines 10 that utilize an exhaust gas recirculation system 40. The internal combustion engine 10 includes a plurality of combustion cylinders 11 and an exhaust gas system 28 fluidly connected to the combustion cylinders. A turbocharger 60 may be fluidly connected to the exhaust gas system 28. An intake air system 50 for supplying air to the combustion cylinders 11 is provided. The intake air system 50 includes an upstream intake section 71 having an upstream elbow 72 and a downstream elbow 76. A downstream intake manifold 51 receives air from the upstream intake section 71 and supplies the air to the combustion cylinders 11. An exhaust gas recirculation system 40 is provided for recirculating exhaust gas from the exhaust gas system to the intake air system. The exhaust gas recirculation system 40 includes a mixing tube 91 configured to introduce exhaust gas into the upstream intake section 71 at a location upstream of the downstream elbow 76. The upstream intake section 71 and mixing tube 91 define an air exhaust mixer assembly 70 that includes an upstream elbow 72 with a first leg 73 and a second leg 74 connected by an upstream bend 75. A downstream elbow 76 has a third leg 77 and a fourth leg 78 connected by a downstream bend 79. The downstream elbow 76 is located downstream from the upstream elbow 72. The second leg 73 of the upstream elbow 72 and the third leg 77 of the downstream elbow 76 may be generally linearly aligned. The mixing tube 91 is configured to introduce exhaust gas into the upstream intake section 71 and is positioned at a location upstream of the downstream elbow 76.

During operation, exhaust gas exits or flows from the first cylinder bank 12 and enters first exhaust manifold 21. The flow of exhaust gas from the first cylinder group 16 towards first turbocharger 60 and through exhaust gas recirculation system 40 is controlled by the position of exhaust restriction valve 26 and by the position of exhaust gas recirculation control valve 44. At start up and some idle conditions, the exhaust gas recirculation control valve 44 may be completely closed. Also in such operating conditions, the exhaust restriction valve 26 may be completely open such that exhaust gas from the first cylinder bank 12 travels through first exhaust manifold 21 and first extension pipe 27 into first turbocharger 60. Exhaust gas from the second cylinder bank 13 travels through the second exhaust manifold 31 and second extension pipe 37 into second turbocharger 61. Since no exhaust gas is being recirculated through the exhaust gas recirculation system 40, exhaust gas from the first cylinder bank 12 is entirely directed towards the first turbocharger 60. Thus, the pressure within the first and second manifolds 21, 31 will be generally equal and little, if any, exhaust gas will travel through the exhaust gas balance tube 65 from the second exhaust manifold 31 to the first exhaust manifold 21.

As engine speed and load increase, it may be desirable to increase the amount of exhaust gas being recirculated or diverted through the exhaust gas recirculation system 40. In doing so, exhaust gas recirculation control valve 44 is utilized to initially control the flow through the exhaust gas recirculation system 40. Once the exhaust gas recirculation control valve 44 is fully open, further increases in the amount of recirculated exhaust gas can be accomplished by gradually closing the exhaust restriction valve 26.

As more exhaust gas is recirculated through exhaust gas recirculation system 40, less exhaust gas from the first cylinder group 16 of first cylinder bank 12 may pass through first exhaust manifold 21 into first turbocharger 60. The reduction in exhaust gas flow within the first cylinder bank may result in a pressure differential between the first exhaust manifold 21 and the second exhaust manifold 31. As a result of greater pressure within second exhaust manifold 31 due to the recirculation of some of the exhaust gas from the first cylinder bank, exhaust gas in the second cylinder bank 13 passes from second exhaust manifold 31 through exhaust gas balance tube 65 into first exhaust manifold 21 to balance the flow through the first and second exhaust manifolds.

Rotation of the first turbocharger 60 compresses air drawn in through the first air intake 53 and rotation of second turbocharger 61 compresses air drawn in through the second air intake 54. The compressed air is routed through first compressed air line 56 and through aftercooler 58. After exiting aftercooler 58, compressed intake air flows through an intake conduit and enters air exhaust mixer assembly 70 where it is mixed with exhaust gas flowing through the exhaust gas recirculation system 40. Compressed air exiting aftercooler 58 enters the upstream elbow 72 of upstream intake section 71 and moves towards downstream elbow 76. More specifically, the compressed air enters the upstream or first leg 73 of upstream elbow 72 and travels around upstream bend 75 and is thus redirected generally along a first curved path generally along a first plane defined by the upstream elbow. The compressed air then enters downstream or second leg 74 of upstream elbow 72. Air traveling from aftercooler 58 and entering upstream or first leg 73 is traveling in a somewhat linear pattern and transforms to a first region of rotation 82 and a second region of rotation 83 as it exits upstream elbow 72. The end of the mixing tube 91 is positioned generally at the upstream elbow 72 in order to introduce or infuse the exhaust gas into the upstream elbow. The transition of the air flow from a somewhat linear pattern as it enters the first leg 73 of the upstream elbow 72 to the pattern depicted in FIG. 7 as it exits the upstream elbow creates significant mixing of the air and exhaust gas. As the air and exhaust gas mixture continues to travel through the upstream intake section 71, it enters the downstream elbow 76 where it is redirected generally along a second curved path generally along a second plane defined by the downstream elbow. Since the upstream elbow 72 and the downstream elbow 76 are rotated or oriented at ninety degrees, the flow of the air and exhaust gas mixture also rotates ninety degrees. As a result, as the air and exhaust gas mixture passes through the downstream elbow 76, the flow of air and exhaust gas transitions from the pattern depicted in FIG. 7 to one having a third region of rotation 85 and a fourth region of rotation 86 as depicted in FIG. 8. This change in rotational patterns results in a significant amount of mixing of the air and exhaust gas. Once the combined air and exhaust gas mixture exits air exhaust mixer assembly 70, it passes through conduit section 97 and enters the respective one of the first downstream intake manifold 51 and the second downstream intake manifold 52 and enters the various combustion cylinders 11.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. An internal combustion engine comprising:
a plurality of combustion cylinders;
an exhaust gas system fluidly connected to the combustion cylinders;
an intake air system defining an airflow path for supplying air to the combustion cylinders, the intake air system including:
an upstream intake section having an upstream elbow and a downstream elbow, the upstream elbow having a first leg and a second leg connected by an upstream bend, the second leg being downstream of the first leg, the first leg, the second leg, and the upstream bend lying in a first plane, the downstream elbow having a third leg, and a fourth leg connected by an downstream bend, the fourth leg being downstream of the third leg, the third leg, the fourth leg, and the downstream bend lying in a second plane, the first plane and the second plane intersecting at an angle of between forty-five and one hundred and thirty-five degrees;
a downstream intake manifold receiving air from the upstream intake section and supplying the air to the combustion cylinders; and
an exhaust gas recirculation system for recirculating exhaust gas from the exhaust gas system to the intake air system, the exhaust gas recirculation system including a mixing tube extending into and substantially parallel with the airflow path of the intake air system at a location upstream of the-second leg and being configured to introduce exhaust gas into the upstream intake section at a location upstream of the second leg and within the airflow path.

2. The internal combustion engine of claim 1, wherein the mixing tube introduces exhaust gas into the upstream elbow.

3. The internal combustion engine of claim 1, wherein the first plane and the second plane are oriented at approximately 90 degrees to one another.

4. The internal combustion engine of claim 1, wherein the upstream bend and the downstream bend are both approximately 90 degree bends.

5. The internal combustion engine of claim 1, wherein the first leg and the second leg of the upstream elbow are both generally perpendicular to the fourth leg of the downstream elbow.

6. The internal combustion engine of claim 1, wherein the second leg of the upstream elbow is generally parallel to the mixing tube.

7. The internal combustion engine of claim 1, wherein the downstream intake manifold is generally elongated and has a longitudinal axis, and the mixing tube is generally linear and is generally perpendicular to the longitudinal axis of the downstream intake manifold.

8. The internal combustion engine of claim 7, wherein the second leg of the upstream elbow is generally parallel to the mixing tube.

9. The internal combustion engine of claim 1, further including an aftercooler, and a path from the aftercooler to an upstream leg of the upstream elbow is generally linear.

10. The internal combustion engine of claim 1, wherein a path from the downstream elbow to the downstream intake manifold is generally linear.

11. An air exhaust mixer assembly comprising:
an upstream intake section defining an airflow path and having an upstream elbow and a downstream elbow;
the upstream elbow having a first leg and a second leg connected by an upstream bend, the second leg being downstream of the first leg;
the downstream elbow having a third leg and a fourth leg connected by a downstream bend, the downstream elbow being located downstream from the upstream elbow, the second leg of the upstream elbow and the third leg of the downstream elbow being generally linearly aligned;
the upstream elbow defining a first curved path along a first plane, the downstream elbow defining a second curved path along a second plane, and the second plane intersecting with the first plane at an angle of between forty-five and one hundred and thirty-five degrees; and
a mixing tube extending into the airflow path of the upstream intake section at a location upstream of the-second leg and being configured to introduce exhaust gas into the upstream intake section at a location upstream of the second leg.

12. The air exhaust mixer assembly of claim 11, wherein the mixing tube introduces exhaust gas into the upstream elbow.

13. The air exhaust mixer assembly of claim 12, wherein the second leg of the upstream elbow is generally parallel to the mixing tube.

14. The air exhaust mixer assembly of claim 11, wherein the first leg of the upstream elbow and the fourth leg of the downstream elbow are generally perpendicular.

15. The air exhaust mixer assembly of claim 11, wherein the first plane and the second plane are oriented at approximately 90 degrees to one another.

16. The air exhaust mixer assembly of claim 11, wherein the upstream bend and the downstream bend are both approximately 90 degree bends.

17. The air exhaust mixer assembly of claim 11, wherein the mixing tube is generally linear and is generally parallel to the second leg of the upstream elbow.

18. The air exhaust mixer assembly of claim 11, wherein the first leg and the second leg of the upstream elbow are both generally perpendicular to the fourth leg of the downstream elbow.

19. A method of mixing air and exhaust gas for an internal combustion engine, comprising:
flowing exhaust gas into an exhaust gas system;
diverting a portion of the exhaust gas into an exhaust gas recirculation system;
flowing intake air into an intake air conduit;
redirecting the intake air along a first curved path generally along a first plane;
redirecting the intake air along a second curved path generally along a second plane, the second plane intersecting with the first plane at an angle of between forty-five and one hundred and thirty-five degrees; and
infusing the intake air with the portion of the exhaust gas at a location upstream of the second curved path, wherein the intake air is infused with the exhaust gas within the first curved path.

20. The internal combustion engine of claim 1, wherein the first plane and the second plane intersect at an angle of between sixty and one hundred and twenty degrees.

* * * * *